United States Patent
Wu

(10) Patent No.: US 12,413,937 B2
(45) Date of Patent: Sep. 9, 2025

(54) METHOD AND DEVICE IN NODES USED FOR WIRELESS COMMUNICATION

(71) Applicant: Lu Wu, Shanghai (CN)

(72) Inventor: Lu Wu, Shanghai (CN)

(73) Assignee: Shanghai Codus Technology Company Limited, Shanghai (CN)

( * ) Notice: Subject to any disclaimer, the term of this patent is extended or adjusted under 35 U.S.C. 154(b) by 371 days.

(21) Appl. No.: 18/120,439

(22) Filed: Mar. 13, 2023

(65) Prior Publication Data

US 2023/0217217 A1 Jul. 6, 2023

Related U.S. Application Data

(63) Continuation of application No. PCT/CN2022/080780, filed on Mar. 14, 2022.

(30) Foreign Application Priority Data

Mar. 16, 2021 (CN) .......................... 202110279372.2

(51) Int. Cl.
*H04W 4/06* (2009.01)
*H04L 5/00* (2006.01)

(52) U.S. Cl.
CPC ..................................... *H04W 4/06* (2013.01)

(58) Field of Classification Search
CPC ......... H04W 4/02; H04W 4/06; H04W 72/00; H04L 5/0023; H04L 5/0053
See application file for complete search history.

(56) References Cited

U.S. PATENT DOCUMENTS

| | | | |
|---|---|---|---|
| 2020/0337058 A1 | 10/2020 | Song | |
| 2020/0351801 A1* | 11/2020 | Jeon | ...................... H04W 52/48 |
| 2021/0037562 A1 | 2/2021 | Takeda | |
| 2021/0099981 A1* | 4/2021 | Cirik | ...................... H04W 72/23 |
| 2022/0386295 A1* | 12/2022 | Zhang | ................... H04W 72/23 |
| 2024/0187178 A1* | 6/2024 | Matsumura | ........... H04L 5/0091 |

FOREIGN PATENT DOCUMENTS

| | | | |
|---|---|---|---|
| CN | 110785958 A | 2/2020 | |
| CN | 111148242 A | 5/2020 | |
| CN | 112134598 A | 12/2020 | |
| EP | 3829218 A1 * | 6/2021 | ........... H04L 5/0048 |

OTHER PUBLICATIONS

ISR received in application No. PCT/CN2022/080780 dated Jun. 6, 2022.
First Office Action of Chinese patent application No. CN202110279372.2 dated Apr. 29, 2023.

* cited by examiner

*Primary Examiner* — Kenny S Lin

(57) ABSTRACT

A first node receives a first signaling. The first signaling comprises a first index and a second index, a first serving cell is identified by the first index, and a first Control Resource Set (CORESET) in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set; when the first CORESET satisfies a first condition, the target cell is a first cell set; when the first CORESET does not satisfy the first condition, the target cell set is a second cell set; the first condition comprises: being related to a non-unicast channel.

20 Claims, 5 Drawing Sheets

(a) when first control resource set satisfies first condition (b) when first control resource set does not satisfy first condition First given cell is a serving cell in first cell set
Second given cell is a serving cell in second cell set Given cell is any serving cell in target cell set Given control resource set is control resource set identified by second index in given cell Given TCI state set is configured with given cell

METHOD AND DEVICE IN NODES USED FOR WIRELESS COMMUNICATION

CROSS REFERENCE TO RELATED APPLICATIONS

This application is the continuation of the international patent application No. PCT/CN2022/080780, filed on Mar. 14, 2022, which claims the priority benefit of Chinese Patent Application No. 202110279372.2, filed on Mar. 16, 2021, the full disclosure of which is incorporated herein by reference.

BACKGROUND

Technical Field

The present application relates to transmission methods and devices in wireless communication systems, and in particular to a method and device of radio signal transmission in a wireless communication system supporting cellular networks.

RELATED ART

In traditional Long-Term Evolution (LTE) and Long-Term Evolution Advanced (LTE-A) systems, a base station supports a terminal to receive multicast and groupcast services through Multicast Broadcast Single Frequency Network (MBSFN) and the method of Single-Cell Point-To-Multipoint (SC-PTM). New Radio (NR) Release (R) 17 has begun to discuss how to support transmission of multicast and broadcast services under 5G architecture, where two PTM transmission modes are under discussion, one of which is a group-common Physical Downlink Control CHannel (PDCCH) scheduling a group-common Physical Downlink Shared CHannel (PDSCH), the other is User Equipment (UE)-specific PDCCH scheduling a group-common PDSCH.

SUMMARY

Inventors have found through researches that using UE-specific downlink resources to transmit information related to multicast groupcast and/or broadcast services can improve resource utilization as well as transmission efficiency of multicast groupcast and/or broadcast services. How to better support configuration and/or update of parameters of multicast groupcast and/or broadcast services is a problem that needs to be solved.

To address the above problem, the present application provides a solution. It should be noted that although downlink is adopted as an example in the above description, the application is also applicable to other scenarios, such as uplink and sidelink, where similar technical effects can be achieved. Additionally, the adoption of a unified solution for various scenarios (including but not limited to downlink, uplink and sidelink) contributes to the reduction of hardcore complexity and costs. If no conflict is incurred, embodiments in any node in the present application and the characteristics of the embodiments are also applicable to any other node, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:
receiving a first signaling;
herein, the first signaling comprises a first index and a second index, a first serving cell is identified by the first index, and a first Control Resource Set (CORESET) in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, a problem to be solved in the present application includes: how to better support configuration and/or update of parameters (such as a TCI state) of multicast groupcast and/or broadcast services.

In one embodiment, a problem to be solved in the present application includes: using UE-specific downlink resources to configure/or update information related to multicast groupcast and/or broadcast services (such as a TCI state).

In one embodiment, characteristics of the above method include: the first signaling activating a first TCI state for a first CORESET of a first serving cell, and the activation command is applied to each serving cell in a target cell set; determining a target cell set according to whether a first CORESET is related to a non-unicast channel. The advantage of the above method is that one signaling updates TCI states of a group of serving cells at the same time, which improves the resource utilization.

According to one aspect of the present application, it is characterized in that a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

In one embodiment, characteristics of the above method include: when a first CORESET is related to a non-unicast channel, any serving cell in a first cell set is related to a non-unicast channel; when a first CORESET is unrelated to a non-unicast channel, any serving cell in a second cell set is unrelated to a non-unicast channel. The advantage of the above method is that since a target receiver of a non-unicast channel comprises a group of UEs, a Transmission Configuration Indicator (TCI) state activation command for a unicast channel is not applied to a non-unicast channel, thus ensuring the reliability of non-unicast channel transmission.

According to one aspect of the present application, wherein the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set.

According to one aspect of the present application, it is characterized in that each of N1 CORESET(s) in the N CORESETs satisfies the first condition, the N1 CORESET(s) belongs (respectively belong) to N1 serving cell(s) in the reference cell set, N1 being a positive integer less than N; the second cell set comprises all serving cells other than the N1 serving cell(s) in the reference cell set; the first cell set comprises the reference cell set, or, the first cell set comprises the N1 serving cell(s).

According to one aspect of the present application, it is characterized in that the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

According to one aspect of the present application, comprising:
transmitting a first signal in a first time unit; and
monitoring a first-type channel in the first CORESET;
herein, the first signal is used to indicate that the first signaling is correctly received, and the first time unit is used to determine the second time unit; starting from the second time unit, the first TCI state is used to determine antenna port Quasi Co-Location (QCL) of the first-type channel in the first CORESET.

According to one aspect of the present application, comprising:
transmitting a first signal in a first time unit; and
the first receiver receiving a second signaling in the first CORESET; the first receiver receiving a second signal;
herein, the first signal is used to indicate that the first signaling is correctly received, time-domain resources occupied by the second signaling are not earlier than a second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

The present application provides a method in a second node for wireless communications, comprising:
transmitting a first signaling;
herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

According to one aspect of the present application, it is characterized in that a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

According to one aspect of the present application, it is characterized in that the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set.

According to one aspect of the present application, it is characterized in that each of N1 CORESET(s) in the N CORESETs satisfies the first condition, the N1 CORESET(s) belongs (respectively belong) to N1 serving cell(s) in the reference cell set, N1 being a positive integer less than N; the second cell set comprises all serving cells other than the N1 serving cell(s) in the reference cell set; the first cell set comprises the reference cell set, or, the first cell set comprises the N1 serving cell(s).

According to one aspect of the present application, it is characterized in that the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

According to one aspect of the present application, comprising:
receiving a first signal in a first time unit; and
transmitting a first-type channel in the first CORESET;
herein, the first signal is used to indicate that the first signaling is correctly received, and the first time unit is used to determine the second time unit; starting from the second time unit, the first TCI state is used to determine antenna port Quasi Co-Location (QCL) of the first-type channel in the first CORESET.

According to one aspect of the present application, comprising:

receiving a first signal in a first time unit; and transmitting a second signaling in the first CORESET; and transmitting a second signal;

herein, the first signal is used to indicate that the first signaling is correctly received, time-domain resources occupied by the second signaling are not earlier than a second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

The present application provides a first node for wireless communication, comprising:

a first receiver, receiving a first signaling;

herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

The present application provides a second node for wireless communications, comprising:

a second transmitter, transmitting a first signaling;

herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, the present application has the following advantages over conventional schemes:

it supports configuration and/or update of a TCI state of multicast groupcast and/or broadcast services;

it configures/or updates a TCI state related to multicast groupcast and/or broadcast services by adopting UE-specific downlink resources.

It ensures the reliability of adopting specific downlink resources to configure/or update multicast groupcast and/or broadcast parameters, which improves resource utilization and improves transmission efficiency of multicast groupcast and/or broadcast services;

one signaling updates TCI states of a group of serving cells at the same time, which improves the resource utilization; a TCI state activation command for a unicast channel is not applied to a non-unicast channel, which ensures the reliability of the non-unicast channel transmission.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
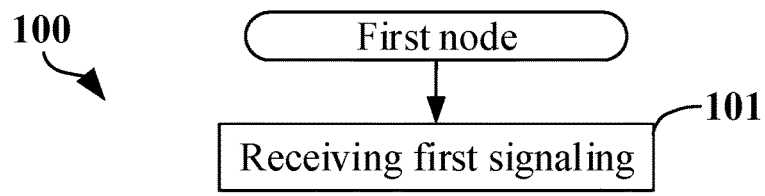
FIG. 1 illustrates a flowchart of a first signaling according to one embodiment of the present application.

Embodiment 1 illustrates a flowchart of a first signaling according to one embodiment of the present application, as shown in FIG. 1. In 100 illustrated by FIG. 1, each box represents a step.

In Embodiment 1, the first node in the present application receives a first signaling in step 101; herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, the first signaling is a higher-layer signaling.

In one embodiment, the first signaling is a Medium Access Control layer Control Element (MAC CE) signaling.

In one embodiment, the first signaling is transmitted on a unicast channel.

In one embodiment, the first signaling is transmitted on a Physical Downlink Shared CHannel (PDSCH).

In one embodiment, the first index indicates the first serving cell.

In one embodiment, the first index is an index of the first serving cell.

In one embodiment, the first index is an ID of the first serving cell.

In one embodiment, a first serving cell is uniquely identified by the first index.

In one embodiment, the first index is a Serving Cell ID.

In one embodiment, the first CORESET is a COntrol REsource SET (CORESET).

In one embodiment, the first CORESET comprises a CORESET.

In one embodiment, the first CORESET comprises at least one Resource Element (RE).

In one embodiment, an RE occupies a symbol in time domain and occupies a subcarrier infrequency domain.

In one embodiment, the symbol is a single carrier symbol.

In one embodiment, the symbol is a multicarrier symbol.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multicarrier (FBMC) symbol.

In one embodiment, the multicarrier symbol comprises a Cyclic Prefix (CP).

In one embodiment, the first CORESET is configured to the first serving cell.

In one embodiment, the first CORESET belongs to the first serving cell.

In one embodiment, the second index is a non-negative integer less than 12.

In one embodiment, the second index is a non-negative integer less than 16.

In one embodiment, in the first serving cell, the second index indicates the first CORESET.

In one embodiment, the first CORESET is uniquely identified by the second index in the first serving cell.

In one embodiment, a first CORESET is one of P CORESET(s), the P CORESET(s) belongs(belong) to the first serving cell; the second index indicates an index of the first CORESET in the P CORESET(s); P is a positive integer, and the second index is a non-negative integer less than P.

In one embodiment, a first CORESET is one of P CORESET(s), the P CORESET(s) belongs(belong) to the first serving cell; the second index is used to indicate the first CORESET out of the P CORESET(s); P is a positive integer.

In one embodiment, the CORESET is a CORESET.

In one embodiment, the CORESET comprises a CORESET.

In one embodiment, the CORESET comprises at least one Resource Element (RE).

In one embodiment, the first signaling comprises a first field and a second field, the first field in the first signaling indicates the first index, and the second field in the first signaling indicates the second index.

In one embodiment, the first field comprises at least one bit, and the second field comprises at least one bit.

In one embodiment, the first field is a Serving Cell ID field, and the second field is a CORESET ID field.

In one embodiment, for the specific meanings of the Serving Cell ID field and the CORESET ID field, refer to section 6 in 3GPP TS38.321.

In one embodiment, the first serving cell is a serving cell of the first node.

In one embodiment, the first serving cell is a serving cell of the first node.

In one embodiment, the first serving cell is a serving cell in the target cell set.

In one embodiment, the target cell set is a first cell set or a second cell set.

In one embodiment, the target cell set only comprises the first serving cell.

In one embodiment, the target cell set comprises multiple serving cells, and the first serving cell is a serving cell in the target cell set.

In one embodiment, the first serving cell belongs to only one of the first cell set and the second cell set.

In one embodiment, the first serving cell belongs to the first cell set, and the first serving cell belongs to the second cell set.

In one embodiment, there exists one serving cell not only belonging to the first cell set but also belonging to the second cell set.

In one embodiment, the second cell set belongs to the first cell set.

In one embodiment, the second cell set comprises at least one serving cell in the first cell set.

In one embodiment, the first cell set and the second cell set do not comprise a same serving cell.

In one embodiment, any serving cell in the first cell set does not belong to the second cell set.

In one embodiment, the first cell set comprises multiple serving cells.

In one embodiment, the first cell set comprises only one serving cell.

In one embodiment, the second cell set comprises multiple serving cells.

In one embodiment, the second cell set comprises only one serving cell.

In one embodiment, the meaning of the phrase that "the first signaling is applied to each serving cell in a target cell set" comprises: the first signaling is used to activate a TCI state of each serving cell in a target cell set.

In one embodiment, the meaning of the phrase that "the first signaling is applied to each serving cell in a target cell set" comprises: the first signaling is used to activate at least one TCI state of each serving cell in a target cell set.

In one embodiment, the meaning of the phrase that "the first signaling is applied to each serving cell in a target cell set" comprises: the first signaling is not applied to a serving cell other than the target cell set.

Embodiment 2

Figure 2:
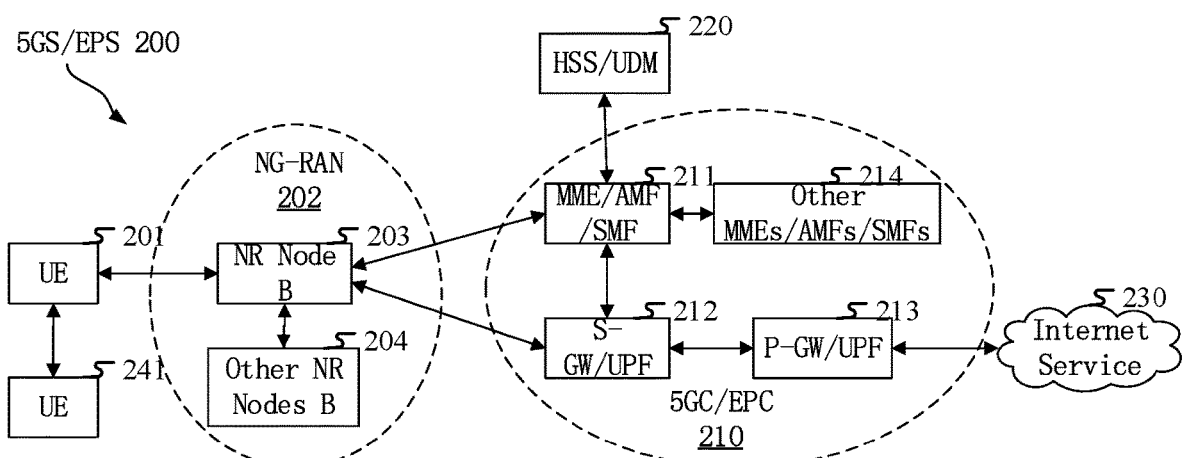
FIG. 2 illustrates a schematic diagram of a network architecture according to one embodiment of the present application.

Embodiment 2 illustrates a schematic diagram of a network architecture according to one embodiment of the present application, as shown in FIG. 2.

FIG. 2 is a diagram illustrating a network architecture 200 of Long-Term Evolution (LTE), Long-Term Evolution Advanced (LTE-A) and future 5G systems. The LTE, LTE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present application can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present application comprises the UE 201.

In one embodiment, the first node in the present application comprises the UE 241.

In one embodiment, the second node in the present application comprises the gNB 203.

Embodiment 3

Figure 3:
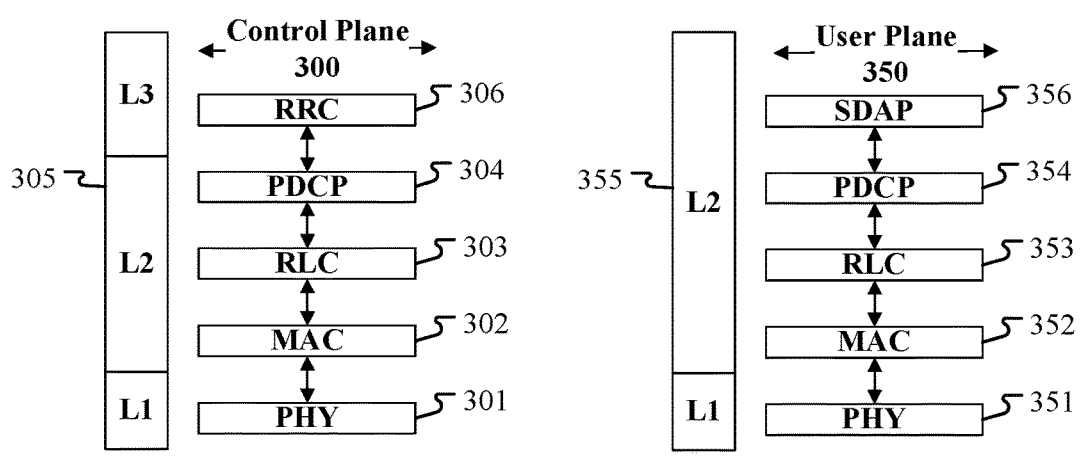
FIG. 3 illustrates a schematic diagram of a radio protocol architecture of a user plane and a control plane according to one embodiment of the present application.

Embodiment 3 illustrates a schematic diagram of a radio protocol architecture of a user plane and a control plane according to one embodiment of the present application, as shown in FIG. 3.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first signaling is generated by the RRC sublayer 306.

In one embodiment, the first signaling is generated by the MAC sublayer 302 or the MAC sublayer 352.

In one embodiment, the first signal is generated by the PHY 301 or the PHY 351.

In one embodiment, the first-type channel is generated by the PHY 301 or the PHY 351.

In one embodiment, the second signaling is generated by the PHY 301 or the PHY 351.

In one embodiment, the second signal is generated by the PHY 301 or the PHY 351.

Embodiment 4

Figure 4:
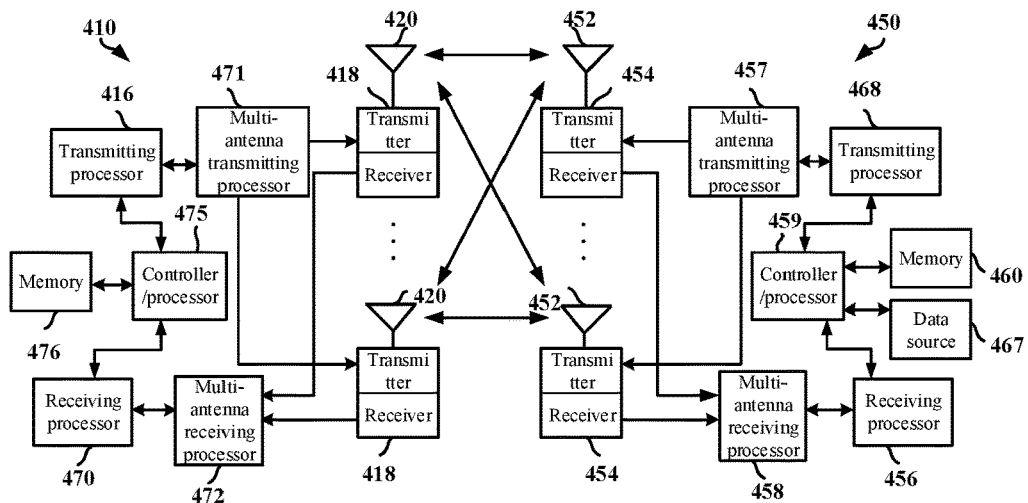
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium, the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives a first signaling; herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, the second communication device 450 comprises a memory that stores a computer readable instruction program. The computer readable instruction program generates an action when executed by at least one processor. The action includes: receiving a first signaling; herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits a first signaling; herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, the first communication device 410 comprises a memory that stores a computer readable instruction program. The computer readable instruction program generates an action when executed by at least one processor. The action includes: transmitting a first signaling; herein, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, the first node comprises the second communication device 450 in the present application.

In one embodiment, the second node in the present application comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first signaling in the present application; at least one of the antenna 420, the transmitter 418, the transmitting processor 416, the multi-antenna transmitting processor 471, the controller/processor 475, or the memory 476 is used to transmit the first signaling in the present application.

In one embodiment, at least one of the antenna 452, the receiver 454, the receiving processor 456, the multi-antenna receiving processor 458, the controller/processor 459, the memory 460, or the data source 467 is used to monitor the first-type channel in the first CORESET in the present application; at least one of the antenna 420, the receiver 418, the receiving processor 416, the multi-antenna transmitting processor 471, the controller/processor 475, or the memory 476 is used to transmit the first-type channel in the first CORESET in the present application.

In one embodiment, at least one of the antenna 452, the receiver 454, the receiving processor 456, the multi-antenna receiving processor 458, the controller/processor 459, the memory 460, or the data source 467 is used to receive the second signaling in the first CORESET in the present application; at least one of the antenna 420, the transmitter 418, the transmitting processor 416, the multi-antenna transmitting processor 471, the controller/processor 475, or the memory 476 is used to transmit the second signaling in the first CORESET in the present application.

In one embodiment, at least one of the antenna 452, the receiver 454, the receiving processor 456, the multi-antenna receiving processor 458, the controller/processor 459, the memory 460, or the data source 467 is used to receive the second signal in the present application; at least one of the antenna 420, the transmitter 418, the transmitting processor 416, the multi-antenna transmitting processor 471, the controller/processor 475, or the memory 476 is used to transmit the second signal in the present application.

In one embodiment, at least one of the antenna 452, the transmitter 454, the transmitting processor 468, the multi-antenna transmitting processor 457, the controller/processor 459, or the memory 460 is used to transmit the first signal in the first time unit in the present application; at least one of the antenna 420, the receiver 418, the receiving processor 470, the multi-antenna receiving processor 472, the controller/processor 475, or the memory 476 is used to receive the first signal in the first time unit in the present application.

Embodiment 5

Figure 5:
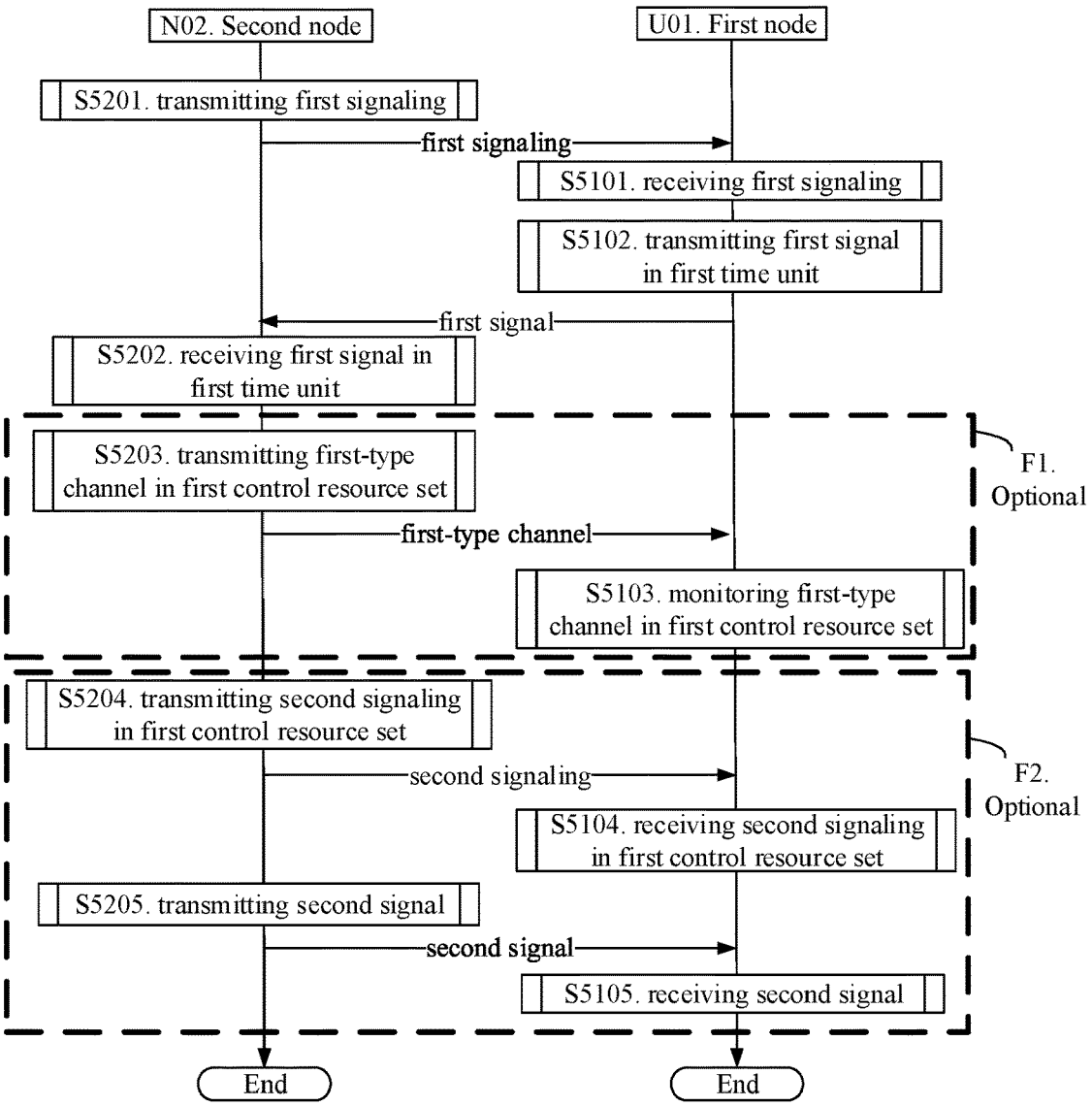
FIG. 5 illustrates a flowchart of wireless communications according to one embodiment of the present application.

Embodiment 5 illustrates a flowchart of wireless transmission according to one embodiment in the present application, as shown in FIG. 5. In FIG. 5, a first node U01 and a second node N02 are respectively communication nodes transmitted via an air interface. In FIG. 5, steps respectively marked by the box F1 and the box F2 are optional.

The first node U01 receives a first signaling in step S5101; transmits a first signal in a first time unit in step S5102; monitors a first-type channel in a first CORESET in step S5103; receives a second signaling in a first CORESET in step S5104; and receives a second signal in step S5105.

The second node N02 transmits a first signaling in step S5201; receives a first signal in a first time unit in step S5202; transmits a first-type channel in a first CORESET in step S5203; transmits a second signaling in a first CORESET in step S5204; and transmits a second signal in step S5205.

In embodiment 5, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, the first signal is used to indicate that the first signaling is correctly received, and the first time unit is used by the first node U01 to determine the second time unit; starting from the second time unit, the first TCI state is used by the first node U01 to determine antenna port Quasi Co-Location (QCL) of the first-type channel in the first CORESET.

In one embodiment, the first signal is used to indicate that the first signaling is correctly received, time-domain resources occupied by the second signaling are not earlier than a second time unit, and the first time unit is used by the first node U01 to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used by the first node U01 to determine antenna port Quasi Co-Location (QCL) of the second signal.

In one embodiment, box marked by F1 exists, and box marked by F2 does not exist.

In one embodiment, box marked by F1 does not exist, and box marked by F2 exists.

In one embodiment, boxes marked by F1 and F2 do not exist.

In one embodiment, a Transmission Configuration Indicator (TCI) state indicates at least one reference signal.

In one embodiment, for the specific meaning of the TCI state, refer to section 5.1.5 in 3GPP TS 38.214.

In one embodiment, the first TCI state is a TCI state.

In one embodiment, the second TCI state is a TCI state.

In one embodiment, the first TCI state set is configured to the first serving cell.

In one embodiment, only the first TCI state in the first TCI state set is activated by the first signaling.

In one embodiment, at least the first TCI state in the first TCI state set is activated by the first signaling.

In one embodiment, the first signaling is used to activate a first TCI state subset out of the first TCI state set, and the first TCI state subset at least comprises a first TCI state; each TCI state in the first TCI state subset is identified by an index in the first index group; the first signaling is used to indicate the first index group.

In one subembodiment of the above embodiment, the first signaling explicitly indicates the first index group.

In one subembodiment of the above embodiment, the first signaling implicitly indicates the first index group.

In one subembodiment of the above embodiment, a number of TCI state(s) comprised in the first TCI state subset is the same as a number of index(es) comprised in the first index group.

In one embodiment, the first signaling is used to indicate the first TCI state out of the first TCI state set.

In one embodiment, the first signaling is used to indicate a third index, and the first TCI state in the first serving cell is identified by the third index, and the third index is a non-negative integer.

In one embodiment, the first signaling comprises a third field, and the third field in the first signaling indicates a third index; the first TCI state in the first serving cell is identified by the third index, and the third index is a non-negative integer.

In one embodiment, the first index group at least comprises the third index.

In one embodiment, the first signaling explicitly indicates the third index.

In one embodiment, the first signaling implicitly indicates the third index.

In one embodiment, the third index is a non-negative integer less than 64.

In one embodiment, the third index is TCI-StateId.

In one embodiment, the third field comprises at least one bit.

In one embodiment, the third field is a TCI State ID field.

In one embodiment, for the specific meaning of the TCI State ID field, refer to section 6 in 3GPP TS38.321.

In one embodiment, the first signaling comprises a first bit string, and the first bit string comprises S bits, S being a positive integer greater than 1; the S bits respectively correspond to S indexes, and the S bits respectively indicate whether a TCI state identified by the S indexes is activated.

In one subembodiment of the above embodiment, a given bit is any bit in the S bits, and a given index is an index corresponding to the given bit among the S indexes; when a value of the given bit is 1, a TCI state identified by the given index is activated.

In one subembodiment of the above embodiment, a given bit is any bit in the S bits, and a given index is an index corresponding to the given bit among the S indexes; when a value of the given bit is 0, a TCI state identified by the given index is deactivated.

In one subembodiment of the above embodiment, the third index is one of the S indexes, and a value of a bit corresponding to the third index among the S bits is 1.

In one subembodiment of the above embodiment, any TCI state in the first TCI state set is identified by one of the S indexes.

In one subembodiment of the above embodiment, any TCI state in the given TCI state set is identified by one of the S indexes.

In one subembodiment of the above embodiment, any index in the first index group is one of the S indexes.

In one subembodiment of the above embodiment, S1 bit(s) is(are) bits with a value of 1 among the S bits, S1 being a positive integer not greater than S; the first index group consists of index(es) respectively corresponding to the S1 bit(s) among the S indexes.

In one embodiment, the meaning of the phrase that "a TCI state in a cell is identified by the third index" comprises: in the cell, the third index indicates the TCI state.

In one embodiment, the meaning of the phrase that "a TCI state in a cell is identified by the third index" comprises: in the cell, the third index is an index of the TCI state.

In one embodiment, the meaning of the phrase that "a TCI state in a cell is identified by the third index" comprises: the TCI state is uniquely identified by the third index in the cell.

In one embodiment, the meaning of the phrase that "a TCI state in a cell is identified by the third index" comprises: a TCI state set is configured to the cell, and the third index is used to indicate the TCI state out of the TCI state set.

In one embodiment, the meaning of the phrase that "a TCI state in a cell is identified by the third index" comprises: a TCI state set is configured to the cell, and the third index is an index of the TCI state in the TCI state set.

In one embodiment, the meaning of the phrase that "a TCI state in a cell is identified by the third index" comprises: a TCI state set is configured to the cell, and the TCI state set comprises the TCI state; in the TCI state set, the TCI state is uniquely identified by the third index.

In one embodiment, the TCI state is the first TCI state in the present application, the cell is the first serving cell in the present application, and the TCI state set comprises the first TCI state set in the present application.

In one embodiment, the TCI state is the given TCI state in the present application, the cell is the given serving cell in the present application, and the TCI state set comprises the given TCI state set in the present application.

In one embodiment, the above method also comprises:
receiving a first information block;
herein, the first information block indicates the first cell set and the second cell set.

In one embodiment, the first information block comprises a first information sub-block and a second information sub-block, the first information sub-block indicates the first cell set, and the second information sub-block indicates the second cell set.

In one embodiment, the first information block is carried by a higher-layer signaling.

In one embodiment, the first information block is carried by an RRC signaling.

In one embodiment, the first information block belongs to an IE.

In one embodiment, the first information sub-block and the second information sub-block respectively belong to two IEs.

In one embodiment, the first information sub-block and the second information sub-block belong to a same IE.

In one embodiment, a name of the first information sub-block comprises simultaneous TCI, and a name of the second information sub-block comprises simultaneous TCI.

In one embodiment, a name of the first information sub-block is the same as a name of the second information sub-block.

In one embodiment, the meaning of the phrase that "a CORESET belongs to a cell" comprises: the CORESET is configured to the cell.

In one embodiment, the meaning of the phrase that "a CORESET belongs to a cell" comprises: the CORESET belongs to time-frequency resources occupied by the cell.

In one embodiment, the meaning of the phrase that "a CORESET belongs to a cell" comprises: an RE occupied by the cell comprises an RE comprised in the CORESET.

In one embodiment, the meaning of the phrase that "a CORESET in a cell is identified by the second index" comprises: in the cell, the second index indicates the CORESET.

In one embodiment, the meaning of the phrase that "a CORESET in a cell is identified by the second index" comprises: the CORESET is uniquely identified by the second index in the cell.

In one embodiment, the meaning of the phrase that "a CORESET in a cell is identified by the second index" comprises: the CORESET is a CORESET in a control resource pool, the control resource pool comprises at least one CORESET, and the control resource pool belongs to the cell; the second index is used to indicate the CORESET out of the control resource pool.

In one embodiment, the meaning of the phrase that "a CORESET in a cell is identified by the second index" comprises: the CORESET is a CORESET in a control resource pool, the control resource pool comprises at least one CORESET, and the control resource pool belongs to the cell; the second index indicates an index of the CORESET in the control resource pool; the second index is a non-negative integer less than a number of CORESET(s) comprised in the control resource pool.

In one embodiment, the CORESET is the first CORESET in the present application, the cell is the first serving cell in the present application, and the control resource pool comprises the P CORESET(s) in the present application.

In one embodiment, the CORESET is the first given CORESET in the present application, and the cell is the first given cell in the present application.

In one embodiment, the CORESET is the second given CORESET in the present application, and the cell is the second given cell in the present application.

In one embodiment, the cell is any serving cell in the N serving cells in the present application, and the CORESET is a CORESET belonging to the cell among the N CORESETs in the present application.

In one embodiment, the first time unit comprises time-domain resources occupied by the first signal.

In one embodiment, the first signal is transmitted on a unicast channel.

In one embodiment, the first signal is transmitted on a Physical Uplink Control Channel (PUCCH).

In one embodiment, the first signal is transmitted on a Physical Uplink Shared CHannel (PUSCH).

In one embodiment, the first signal explicitly indicates that the first signaling is correctly received.

In one embodiment, the first signal implicitly indicates that the first signaling is correctly received.

In one embodiment, the first signaling comprises HARQ-ACK information of the first signaling, and the HARQ-ACK information of the first signaling is an ACK.

In one embodiment, the first signal indicates that a physical-layer channel occupied by the first signaling is correctly received.

In one embodiment, the first signal indicates that a PDSCH occupied by the first signaling is correctly received.

In one embodiment, the first signal indicates HARQ-ACK information providing a PDSCH of the first signaling.

In one embodiment, the first signal indicates that HARQ-ACK information providing a PDSCH of the first signaling is an ACK.

In one embodiment, the first signal is a PUCCH comprising HARQ-ACK information for a PDSCH providing the first signaling.

In one embodiment, the meaning of the phrase that "the first time unit is used to determine the second time unit" comprises: the second time unit is not earlier than the first time unit, a time interval between a second time unit and the first time unit is equal to a first target threshold, and the first target threshold is measured by the time unit.

In one embodiment, the meaning of the phrase that "the first time unit is used to determine the second time unit" comprises: the second time unit is the earliest time unit satisfying a requirement not earlier than the first time unit and its time interval with the first time unit being not less than a first target threshold.

In one embodiment, the meaning of the phrase that "the first time unit is used to determine the second time unit" comprises: the third time unit is not earlier than the first time unit, and a time interval between the third time unit and the first time unit is equal to the first target threshold; the second time unit is a start time unit after the third time unit.

In one embodiment, the phrase of "a start time unit after the third time unit" refers to an earliest time unit later than the third time unit in time domain.

In one embodiment, the phrase of "a start time unit after the third time unit" refers to an earliest time unit not earlier than the third time unit in time domain.

In one embodiment, a time interval between two time units is a time interval between start times of the two time units.

In one embodiment, a time interval between two time units is a time interval between end times of the two time units.

In one embodiment, the first time unit is k, and the first target threshold is $3 \cdot N_{slot}^{subframe,\mu}$; $\mu$ is a Subcarrier Spacing (SCS) of the first signal, $N_{slot}^{subframe,\mu}$ is a number of slot(s) comprised in a subframe for an SCS $\mu$.

In one embodiment, the first time unit is k, the first target threshold is $3 \cdot N_{slot}^{subframe,\mu}$, and the third time unit is $k+3 \cdot N_{slot}^{subframe,\mu}$; $\mu$ is an SCS of the first signal, $N_{slot}^{subframe,\mu}$ is a number of slot(s) comprised in a subframe for an SCS $\mu$.

In one embodiment, the time unit is a slot.

In one embodiment, the time unit is a sub-slot.

In one embodiment, the time unit is a symbol.

In one embodiment, the time unit comprises more than one continuous symbols.

In one embodiment, a number of symbols comprised in the time unit is configured by a higher-layer parameter.

In one embodiment, the third time unit is the time unit.

In one embodiment, the first time unit is the time unit, and the second time unit is the time unit.

In one embodiment, the symbol is a single carrier symbol.

In one embodiment, the symbol is a multicarrier symbol.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multicarrier (FBMC) symbol.

In one embodiment, the multicarrier symbol comprises a Cyclic Prefix (CP).

In one embodiment, the first-type channel is a Physical Downlink Control Channel (PDCCH) channel.

In one embodiment, the first-type channel is a short PDCCH (sPDCCH).

In one embodiment, the first-type channel is a Narrow Band PDCCH (NB-PDCCH).

In one embodiment, the meaning of the phrase of "monitoring a given signal" comprises: the monitoring refers to blind decoding, that is, a signal is received and decoding operation is performed; if decoding is determined correct according to a CRC bit, it is judged that the given signal is detected; otherwise, it is judged that the given signal is not detected.

In one embodiment, the meaning of the phrase of "monitoring a given signal" comprises: the monitoring refers to a coherent detection, that is, coherent reception is performed and energy of a signal acquired after the coherent reception is measured; if energy of the signal acquired after the coherent reception is greater than a first given threshold, it is judged that the given signal is detected; otherwise, it is judged that the given signal is not detected.

In one embodiment, the meaning of the phrase of "monitoring a given signal" comprises: the monitoring refers to an energy detection, that is, energy of a radio signal is sensed and is averaged to acquire received energy; if the receive energy is greater than a second given threshold, it is judged that the given signal is detected; otherwise, it is judged that the given signal is not detected.

In one embodiment, the meaning of the phrase of "monitoring a given signal" comprises: determining whether the given signal is transmitted according to a CRC.

In one embodiment, the meaning of the phrase of "monitoring a given signal" comprises: not determining whether the given signal is transmitted before judging whether decoding is correct according to CRC.

In one embodiment, the meaning of the phrase of "monitoring a given signal" comprises: determining whether the given signal is transmitted according to a coherent detection.

In one embodiment, the meaning of the phrase of "monitoring a given signal" comprises: not determining whether the given signal is transmitted before a coherent detection.

In one embodiment, the meaning of the phrase of "monitoring a given signal" comprises: determining whether the given signal is transmitted according to an energy detection.

In one embodiment, the meaning of the phrase of "monitoring a given signal" comprises: not determining whether the given signal is transmitted before an energy detection.

In one embodiment, the given signal is the first-type channel in the present application.

In one embodiment, the second signaling is transmitted on a PDCCH.

In one embodiment, the second signaling is transmitted on an sPDCCH.

In one embodiment, the second signaling is transmitted on an NB-PDCCH.

In one embodiment, the second signal is transmitted on a Physical Downlink Shared Channel (PDSCH).

In one embodiment, the second signal is transmitted on a short PDSCH (sPDSCH).

In one embodiment, the second signal is transmitted on a Narrow Band PDSCH (NPDSCH).

In one embodiment, the second signaling comprises scheduling information of the second signal, and the scheduling information of the second signal comprises the second TCI state.

In one embodiment, the scheduling information of the second signal comprises at least one of occupied time-domain resources, occupied frequency-domain resources, an MCS, configuration information of DMRS, a HARQ process number, an RV, an NDI, a transmitting antenna port, an SRS resource indication, precoding information or a number of layer(s).

In one embodiment, a time unit to which the second signaling belongs in time domain is not earlier than the second time unit.

In one embodiment, a first given time unit being not earlier than a second given time unit refers to: a start time of a first given time unit is not earlier than a start time of a second given time unit.

In one embodiment, a first given time unit being not earlier than a second given time unit refers to: an end time of a first given time unit is not earlier than an end time of a second given time unit.

In one embodiment, a first given time unit being not earlier than a second given time unit refers to: a first given time unit is the same as a second given time unit, or, a start time of a first given time unit is later than an end time of a second given time unit.

In one embodiment, a first given time unit being later than a second given time unit refers to: a start time of a first given time unit is later than a start time of a second given time unit.

In one embodiment, a first given time unit being later than a second given time unit refers to: a start time of a first given time unit is later than an end time of a second given time unit.

In one embodiment, the second signaling comprises a fourth field, and the fourth field in the second signaling is used to indicate a second TCI state out of the first TCI state subset.

In one embodiment, the second signaling indicates an index of the second TCI state in the first TCI state subset.

In one embodiment, the second signaling indicates a TCI codepoint corresponding to the second TCI state.

In one embodiment, a value of the fourth field in the second signaling is equal to a TCI codepoint corresponding to the second TCI state.

In one embodiment, the fourth field comprises at least one bit.

In one embodiment, the fourth field comprises 3 bits.

In one embodiment, the fourth field comprises a Transmission configuration indication field.

In one embodiment, for the specific meaning of the Transmission configuration indication field, refer to section 7.3 in 3GPP TS38.212.

In one embodiment, the meaning of the phrase that "the second TCI state is used to determine antenna port Quasi Co-Location (QCL) of the second signal" comprises: the first node assumes that a DMRS port of the second signal and one or multiple reference signals indicated by the second TCI state are Quasi Co-Located (QCL).

In one embodiment, the meaning of the phrase that "the second TCI state is used to determine antenna port Quasi Co-Location (QCL) of the second signal" comprises: the first node assumes that an antenna port of the second signal and one or multiple reference signals indicated by the second TCI state are Quasi Co-Located (QCL).

In one embodiment, the meaning of the phrase that "the second TCI state is used to determine antenna port Quasi Co-Location (QCL) of the second signal" comprises: the first node receives a reference signal indicated by the second TCI state and receives the second signal with a same QCL parameter.

In one embodiment, the meaning of the phrase that "the second TCI state is used to determine antenna port Quasi Co-Location (QCL) of the second signal" comprises: the first node receives a reference signal indicated by the second TCI state and to receive the second signal with a same spatial domain filter.

In one embodiment, the meaning of the phrase that "the second TCI state is used to determine antenna port Quasi Co-Location (QCL) of the second signal" comprises: the first node transmits a reference signal indicated by the second TCI state and receives the second signal with a same QCL parameter.

In one embodiment, the meaning of the phrase that "the second TCI state is used to determine antenna port Quasi Co-Location (QCL) of the second signal" comprises: the first node transmits a reference signal indicated by the second TCI state and to receive the second signal with a same spatial domain filter.

In one embodiment, the meaning of the phrase that "the second TCI state is used to determine antenna port Quasi Co-Location (QCL) of the second signal" comprises: large-scale properties of a channel that a reference signal indicated by the second TCI state is conveyed can be used to infer large-scale properties of a channel that the second signal is conveyed.

Embodiment 6

Figure 6:
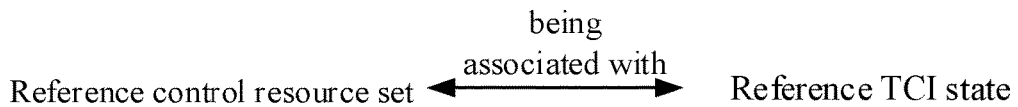
FIG. 6 illustrates a schematic diagram of a reference CORESET being associated with a reference TCI state according to one embodiment of the present application.

Embodiment 6 illustrates a schematic diagram of a reference CORESET being associated with a reference TCI state according to one embodiment of the present application, as shown in FIG. 6.

In embodiment 6, the reference CORESET is the first CORESET in the present application, and the reference TCI state is the first TCI state in the present application; or, the reference CORESET is the given CORESET in the present application, and the reference TCI state is the given TCI state in the present application.

In one embodiment, the meaning of the phrase that "a reference CORESET is associated with a reference TCI state" comprises: a reference TCI state is used to determine antenna port Quasi Co-Location (QCL) of a first-type channel in a reference CORESET.

In one embodiment, the meaning of the phrase that "a reference CORESET is associated with a reference TCI state" comprises: large-scale properties of a channel that a reference signal indicated by a reference TCI state is conveyed can be used to infer large-scale properties of a channel that a first-type channel in a reference CORESET is conveyed.

In one embodiment, the meaning of the phrase that "a reference CORESET is associated with a reference TCI state" comprises: the first signaling is used to activate a reference TCI state subset out of a reference TCI state set, a reference TCI state subset comprises a reference TCI state, and a PDCCH in a reference CORESET indicates a TCI state in a reference TCI state subset.

In one embodiment, the meaning of the phrase that "a reference CORESET is associated with a reference TCI state" comprises: the first signaling is used to activate a reference TCI state subset out of a reference TCI state set, a reference TCI state subset comprises a reference TCI state, and Quasi Co-Location of a PDSCH scheduled by a PDCCH in a reference CORESET is determined by a TCI state in a reference TCI state subset.

In one embodiment, the meaning of the phrase that "a reference TCI state is used to determine antenna port Quasi Co-Location (QCL) of a first-type channel in a reference CORESET" comprises: the first node assumes that a transmitting antenna port of a first-type channel in a reference CORESET and one or multiple reference signals indicated by a reference TCI state are quasi co-located.

In one embodiment, the meaning of the phrase that "a reference TCI state is used to determine antenna port Quasi Co-Location (QCL) of a first-type channel in a reference CORESET" comprises: the first node assumes that a DMRS antenna port associated with a reception for a first-type channel in a reference CORESET and one or multiple reference signals indicated by a reference TCI state are QCL.

In one embodiment, the meaning of the phrase that "a reference TCI state is used to determine antenna port Quasi Co-Location (QCL) of a first-type channel in a reference CORESET" comprises: the first node receives a reference signal indicated by a reference TCI state and monitors a first-type channel in a reference CORESET with a same QCL parameter.

In one embodiment, the meaning of the phrase that "a reference TCI state is used to determine antenna port Quasi Co-Location (QCL) of a first-type channel in a reference CORESET" comprises: the first node receives a reference signal indicated by a reference TCI state and monitors a first-type channel in a reference CORESET with a same spatial-domain filter.

In one embodiment, the meaning of the phrase that "a reference TCI state is used to determine antenna port Quasi Co-Location (QCL) of a first-type channel in a reference CORESET" comprises: the first node transmits a reference signal indicated by a reference TCI state and monitors a first-type channel in a reference CORESET with a same QCL parameter.

In one embodiment, the meaning of the phrase that "a reference TCI state is used to determine antenna port Quasi Co-Location (QCL) of a first-type channel in a reference CORESET" comprises: the first node transmits a reference signal indicated by a reference TCI state and monitors a first-type channel in a reference CORESET with a same spatial-domain filter.

In one embodiment, the meaning of the phrase that "QCL of a PDSCH scheduled by a PDCCH in a reference CORESET is determined by a TCI state in a reference TCI state subset" comprises: the first node assumes that a transmitting antenna port of a PDSCH scheduled by a PDCCH in a reference CORESET and one or multiple reference signals indicated by a TCI state in a reference TCI state subset are QCL.

In one embodiment, the meaning of the phrase that "QCL of a PDSCH scheduled by a PDCCH in a reference CORESET is determined by a TCI state in a reference TCI state subset" comprises: the first node assumes that a DMRS port of a PDSCH scheduled by a PDCCH in a reference CORESET and one or multiple reference signals indicated by a TCI state in a reference TCI state subset are QCL.

In one embodiment, the meaning of the phrase that "QCL of a PDSCH scheduled by a PDCCH in a reference CORESET is determined by a TCI state in a reference TCI state subset" comprises: the first node receives a PDSCH scheduled by a PDCCH in a reference CORESET and receives a reference signal indicated by a TCI state in a reference TCI state subset with a same QCL parameter.

In one embodiment, the meaning of the phrase that "QCL of a PDSCH scheduled by a PDCCH in a reference CORESET is determined by a TCI state in a reference TCI state subset" comprises: the first node receives a PDSCH scheduled by a PDCCH in a reference CORESET and transmits a reference signal indicated by a TCI state in a reference TCI state subset with a same QCL parameter.

In one embodiment, the meaning of the phrase that "QCL of a PDSCH scheduled by a PDCCH in a reference CORESET is determined by a TCI state in a reference TCI state subset" comprises: the first node receives a PDSCH scheduled by a PDCCH in a reference CORESET and receives a reference signal indicated by a TCI state in a reference TCI state subset with a same spatial-domain filter.

In one embodiment, the meaning of the phrase that "QCL of a PDSCH scheduled by a PDCCH in a reference CORESET is determined by a TCI state in a reference TCI state subset" comprises: the first node receives a PDSCH scheduled by a PDCCH in a reference CORESET and transmits a reference signal indicated by a TCI state in a reference TCI state subset with a same spatial-domain filter.

In one embodiment, the meaning of the phrase that "QCL of a PDSCH scheduled by a PDCCH in a reference CORESET is determined by a TCI state in a reference TCI state subset" comprises: large-scale properties of a channel that a reference signal indicated by a TCI state in a reference TCI state subset is conveyed can be used to infer large-scale properties of a channel that a PDSCH scheduled by a PDCCH transmitted in a reference CORESET is conveyed.

In one embodiment, the reference CORESET is the first CORESET in the present application, and the reference TCI state is the first TCI state in the present application.

In one embodiment, the reference CORESET is the given CORESET in the present application, and the reference TCI state is the given TCI state in the present application.

In one embodiment, the reference CORESET is the first CORESET in the present application, the reference TCI state is the first TCI state in the present application, the reference TCI state set is the first TCI state set in the present application, and the reference TCI state subset is the first TCI state subset in the present application.

In one embodiment, the reference CORESET is the given CORESET in the present application, the reference TCI state is the given TCI state in the present application, the reference TCI state set is the given TCI state set in the present application, and the reference TCI state subset is the given TCI state subset in the present application.

In one embodiment, the QCL refers to Quasi Co-Located.

In one embodiment, the QCL refers to Quasi Co-Location.

In one embodiment, the QCL comprises a QCL parameter.

In one embodiment, the QCL comprises QCL Type-A.

In one embodiment, the QCL comprises QCL Type-B.

In one embodiment, the QCL comprises QCL Type-C.

In one embodiment, the QCL comprises QCL Type-D.

In one embodiment, the QCL comprises at least QCL Type-D of QCL Type-A, QCL Type-B, QCL Type-C or QCL Type-D.

In one embodiment, for specific meaning of the QCL type-A, the QCL type-B, the QCL type-C and the QCL type-D, see section 5.1.5 in 3GPP TS38.214.

In one embodiment, the QCL parameters comprise one or more of delay spread, Doppler spread, Doppler shift, average delay, Spatial Tx parameter or Spatial Rx parameter.

In one embodiment, the Spatial Tx parameter comprise one or more of a transmitting antenna port, a transmitting antenna port group, a transmitting beam, a transmitting analog beamforming matrix, a transmitting analog beamforming vector, a transmitting beamforming matrix, a transmitting beamforming vector or a spatial-domain transmitting filter.

In one embodiment, the Spatial Rx parameter comprise one or more of a receiving beam, a receiving analog beamforming matrix, a receiving analog beamforming vector, a receiving beamforming matrix, a receiving beamforming vector or a spatial-domain receiving filter.

Embodiment 7

Figure 7:
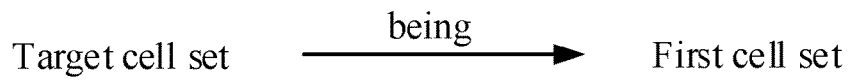
FIG. 7 illustrates a schematic diagram of determining a target cell set according to one embodiment of the present application.
Figure 7:
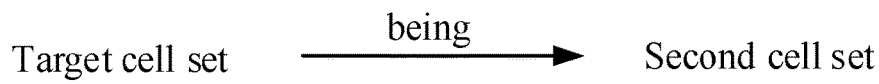
Figure 7:
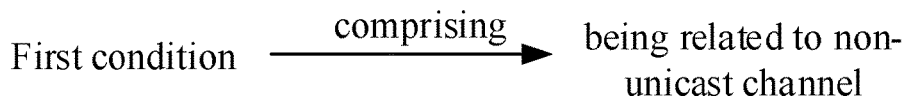

Embodiment 7 illustrates a schematic diagram of determining a target cell set according to one embodiment of the present application, as shown in FIG. 7.

In embodiment 7, when the first CORESET satisfies a first condition, the target cell is a first cell set; when the first CORESET does not satisfy the first condition, the target cell set is a second cell set; the first condition comprises: being related to a non-unicast channel.

In one embodiment, the target cell set is determined according to whether the first CORESET is related to a non-unicast channel.

In one embodiment, the target cell set is determined according to whether the first CORESET satisfies a first condition.

In one embodiment, the unicast channel is used to transmit unicast services, and the non-unicast channel is used to transmit non-unicast services.

In one embodiment, the unicast channel comprises a Physical Downlink Control Channel (PDCCH) channel.

In one embodiment, the unicast channel comprises a Physical Downlink Shared CHannel (PDSCH).

In one embodiment, the unicast channel comprises a unicast PDCCH.

In one embodiment, the unicast channel comprises a unicast PDSCH.

In one embodiment, the non-unicast channel comprises a group-common PDCCH.

In one embodiment, the unicast channel comprises a group-common PDSCH.

In one embodiment, both the unicast channel and the non-unicast channel are physical-layer channels.

In one embodiment, the non-unicast channel comprises a Multicast CHannel (MCH).

In one embodiment, the non-unicast channel comprises a Single Carrier (SC)-MCH.

In one embodiment, the non-unicast channel comprises a Broadcast CHannel (BCH).

In one embodiment, the non-unicast channel comprises an MCH and a broadcast channel.

In one embodiment, a logical channel occupied by the unicast channel comprises a Dedicated Control Channel (DCCH).

In one embodiment, a logical channel occupied by a transmission on the non-unicast channel comprises a Common Control Channel (CCCH).

In one embodiment, a logical channel occupied by the unicast channel comprises a Dedicated Traffic Channel (DTCH).

In one embodiment, a logical channel occupied by a transmission on the non-unicast channel comprises a Multicast Control Channel (MCCH).

In one embodiment, a logical channel occupied by a transmission on the non-unicast channel comprises a Multicast Traffic Channel (MTCH).

In one embodiment, the unicast service comprises Point-To-Point (PTP) service.

In one embodiment, the unicast service comprises unicast service.

In one embodiment, the multicast service comprises Point-To-Multipoint (PTM) service.

In one embodiment, the multicast service comprises multicast service.

In one embodiment, the multicast service comprises broadcast service.

In one embodiment, the multicast service comprises Multimedia Broadcast Multicast Service (MBMS).

In one embodiment, the first identifier set is applied to the unicast channel, and a second identifier set is applied to the non-unicast channel.

In one embodiment, the meaning of the phrase that "a first identifier set is applied to the unicast channel" comprises: the first identifier set comprises at least one RNTI, and a CRC of the unicast channel is scrambled by an RNTI in a first identifier set; the meaning of the phrase that "a second identifier set is applied to the non-unicast channel" comprises: the second identifier set comprises at least one RNTI, and a CRC of the non-unicast channel is scrambled by an RNTI in a second identifier set.

In one embodiment, the meaning of the phrase is "a first identifier set is applied to the unicast channel" comprises: the first identifier set comprises at least one RNTI, and an RNTI in the first identifier set is used to generate a scrambling sequence of the unicast channel; the meaning of the phrase that "a second identifier set is applied to the non-unicast channel" comprises: the second identifier set comprises at least one RNTI, and an RNTI in the second identifier set is used to generate a scrambling sequence of the non-unicast channel.

In one embodiment, the first identifier comprises at least one non-negative integer, and the second identifier set comprises at least one non-negative integer.

In one embodiment, the first identifier set comprises at least one RNTI, and the second identifier set comprises at least one RNTI.

In one embodiment, the RNTI is a non-negative integer.

In one embodiment, the first identifier set and the second identifier set are different.

In one embodiment, any RNTI in the first identifier set does not belong to the second identifier set.

In one embodiment, any integer in the first identifier set does not belong to the second identifier set.

In one embodiment, the first identifier set comprises a UE-specific RNTI.

In one embodiment, any RNTI in the first identifier set is a UE-specific RNTI.

In one embodiment, the first identifier set does not comprise a group-common RNTI.

In one embodiment, the first identifier set does not comprise a common RNTI.

In one embodiment, the first identifier set comprises a Cell-RNTI (C-RNTI).

In one embodiment, the first identifier set comprises at least one of a C-RNTI, a Configured Scheduling (CS)-RNTI or a Modulation and Coding Scheme (MCS)-C-RNTI.

In one embodiment, the second identifier set comprises a group-common RNTI.

In one embodiment, the second identifier set comprises a common RNTI.

In one embodiment, any RNTI in the second identifier set is a group-common RNTI.

In one embodiment, any RNTI in the second identifier set is a common RNTI.

In one embodiment, the second identifier set does not comprise a UE-specific RNTI.

In one embodiment, the second identifier set does not comprise a C-RNTI.

In one embodiment, the second identifier set comprises a Group-RNTI (G-RNTI).

In one embodiment, the second identifier set comprises a Multicast-RNTI (M-RNTI).

In one embodiment, the second identifier set comprises a Group Common-RNTI (GC-RNTI).

In one embodiment, the second identifier set comprises a Single Carrier-Point to Multipoint-RNTI (SC-PTM-RNTI).

In one embodiment, the second identifier set comprises at least one of a G-RNTI, an M-RNTI, a GC-RNTI or an SC-PTM-RNTI.

In one embodiment, when a CORESET is related to a non-unicast channel, the CORESET satisfies the first condition; when a CORESET is unrelated to a non-unicast channel, the CORESET does not satisfy the first condition;

In one embodiment, the first condition comprises more than one sub-condition, and a first sub-condition is a sub-condition in the first condition; the first sub-condition comprises: being related to a non-unicast channel.

In one subembodiment of the above embodiment, when a CORESET satisfies any sub-condition in the first condition, the CORESET satisfies the first condition; when the CORESET does not satisfy each sub-condition in the first condition, the CORESET does not satisfy the first condition.

In one subembodiment of the above embodiment, when a CORESET satisfies each sub-condition in the first condition, the CORESET satisfies the first condition; when the CORESET does not satisfy any sub-condition in the first condition, the CORESET does not satisfy the first condition.

In one subembodiment of the above embodiment, the first condition comprises a second sub-condition, and the second sub-condition is a sub-condition of the first condition; the second sub-condition comprises: belonging to a first frequency-domain resource set in frequency domain.

In one embodiment, the first frequency-domain resource set comprises at least one RB.

In one embodiment, the first frequency-domain resource set is used for a transmission of a non-unicast channel.

In one embodiment, the first frequency-domain resource set is common frequency resource (CFR).

In one embodiment, the meaning of the phrase that "a CORESET is related to a non-unicast channel" comprises: the CORESET is used for transmitting a non-unicast channel.

In one embodiment, the meaning of the phrase that "a CORESET is related to a non-unicast channel" comprises:

the CORESET is used for transmitting only a non-unicast channel in a non-unicast channel and a unicast channel.

In one embodiment, the meaning of the phrase that "a CORESET is related to a non-unicast channel" comprises: the CORESET is used for transmitting at least a non-unicast channel in a non-unicast channel and a unicast channel.

In one embodiment, the meaning of the phrase that "a CORESET is related to a non-unicast channel" comprises: the CORESET belongs to a first frequency-domain resource set in frequency domain.

In one embodiment, the meaning of the phrase that "a CORESET is unrelated to a non-unicast channel" comprises: the CORESET is used for transmitting a unicast channel.

In one embodiment, the meaning of the phrase that "a CORESET is unrelated to a non-unicast channel" comprises: the CORESET is used for transmitting only a unicast channel in a non-unicast channel and a unicast channel.

In one embodiment, the meaning of the phrase that "a CORESET is unrelated to a non-unicast channel" comprises: the CORESET does not belong to a first frequency-domain resource set in frequency domain.

In one embodiment, the meaning of the phrase that "a CORESET is related to a non-unicast channel" comprises: a second identifier set is applied to a group-common PDSCH scheduled by a PDCCH in the CORESET; the meaning of the phrase that "a CORESET is unrelated to a non-unicast channel" comprises: a first identifier set is applied to a unicast PDSCH scheduled by a PDCCH in the CORESET.

In one embodiment, the meaning of the phrase that "a CORESET is related to a non-unicast channel" comprises: a second identifier set is applied to a PDSCH scheduled by a PDCCH in the CORESET; the meaning of the phrase that "a CORESET is unrelated to a non-unicast channel" comprises: a first identifier set is applied to a PDSCH scheduled by a PDCCH in the CORESET.

In one embodiment, the meaning of the phrase that "a CORESET is related to a non-unicast channel" comprises: a second identifier set is applied to a first-type channel in the CORESET; the meaning of the phrase that "a CORESET is unrelated to a non-unicast channel" comprises: a first identifier set is applied to a first-type channel in the CORESET.

In one embodiment, the meaning of the phrase that "a CORESET is related to a non-unicast channel" comprises: a second identifier set is applied to a group-common PDCCH in the CORESET; the meaning of the phrase that "a CORESET is unrelated to a non-unicast channel" comprises: a first identifier set is applied to a unicast PDCCH in the CORESET.

In one embodiment, the CORESET is the first CORESET in the present application.

In one embodiment, the CORESET is the first given CORESET in the present application.

In one embodiment, the CORESET is the second given CORESET in the present application.

In one embodiment, the CORESET is one of the N CORESETs in the present application.

In one embodiment, the meaning of the phrase that "a given identifier set is applied to a given channel" comprises: the given identifier set comprises at least one RNTI, and a CRC of the given channel is scrambled by an RNTI in the given identifier set.

In one embodiment, the meaning of the phrase that "a given identifier set is applied to a given channel" comprises: the given identifier set comprises at least one RNTI, and an RNTI in the given identifier set is used to generate a scrambling sequence of the given channel.

In one embodiment, the given identifier set is the second identifier set in the present application, and the given channel is a group-common PDSCH scheduled by a PDCCH in the CORESET in the present application.

In one embodiment, the given identifier set is the first identifier set in the present application, and the given channel is a unicast PDSCH scheduled by a PDCCH in the CORESET in the present application.

In one embodiment, the given identifier set is the second identifier set in the present application, and the given channel is a PDSCH scheduled by a PDCCH in the CORESET in the present application.

In one embodiment, the given identifier set is the first identifier set in the present application, and the given channel is a PDSCH scheduled by a PDCCH in the CORESET in the present application.

In one embodiment, the given identifier set is the second identifier set in the present application, and the given channel is a first-type channel in the CORESET in the present application.

In one embodiment, the given identifier set is the first identifier set in the present application, and the given channel is a first-type channel in the CORESET in the present application.

In one embodiment, the given identifier set is the second identifier set in the present application, and the given channel is a group-common PDCCH in the CORESET in the present application.

In one embodiment, the given identifier set is the first identifier set in the present application, and the given channel is a unicast PDCCH in the CORESET in the present application.

Embodiment 8

Figure 8:
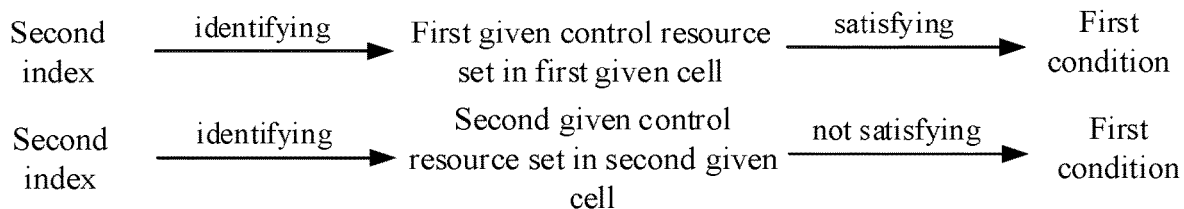
FIG. 8 illustrates a schematic diagram of a first cell set and a second cell set according to one embodiment of the present application.

Embodiment 8 illustrates a schematic diagram of a first cell set and a second cell set according to one embodiment of the present application, as shown in FIG. 8.

In embodiment 8, a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

In one embodiment, there exists a CORESET identified by the second index in a serving cell in the first cell set not satisfying the first condition.

In one embodiment, the first given cell is any serving cell in the first cell set.

Embodiment 9

Figure 9:
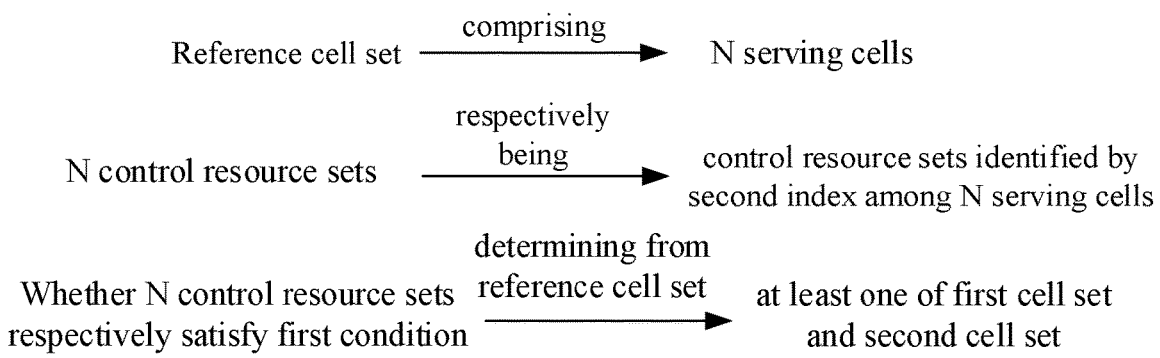
FIG. 9 illustrates a schematic diagram of a first cell set and a second cell set according to another embodiment of the present application.

Embodiment 9 illustrates a schematic diagram of a first cell set and a second cell set according to another embodiment of the present application, as shown in FIG. 9.

In embodiment 9, the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set.

In one embodiment, whether the N CORESETs respectively satisfy the first condition is used to determine only one cell set of the first cell set or the second cell set out of the reference cell set.

In one embodiment, whether the N CORESETs respectively satisfy the first condition is used to determine the second cell set out of the reference cell set.

In one embodiment, whether the N CORESETs respectively satisfy the first condition is used to determine only the second cell set in the first cell set or the second cell set out of the reference cell set.

In one embodiment, whether the N CORESETs respectively satisfy the first condition is used to determine the first cell set or the second cell set out of the reference cell set.

In one embodiment, the above method also comprises:
receiving a first information block;
herein, the first information block indicates the reference cell set.

In one embodiment, the first information block comprises a simultaneous TCI-UpdateList1-r16 parameter.

In one embodiment, the first information block comprises a simultaneous TCI-UpdateList2-r16 parameter.

In one embodiment, a name of the first information block comprises simultaneous TCI.

Embodiment 10

Figure 10:
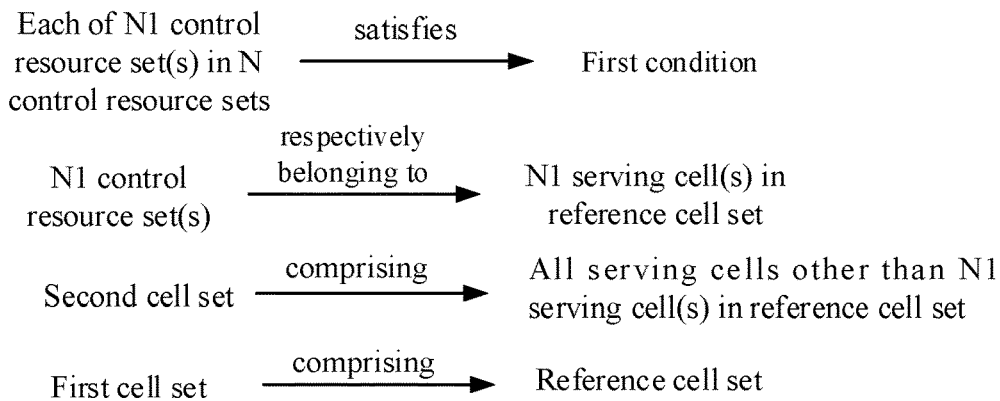
FIG. 10 illustrates a schematic diagram of whether N CORESETs respectively satisfy a first condition being used to determine a second cell set out of a reference signal set according to one embodiment of the present application.

Embodiment 10 illustrates a schematic diagram of whether N CORESETs respectively satisfy a first condition being used to determine a second cell set out of a reference signal set according to one embodiment of the present application, as shown in FIG. 10.

In embodiment 10, each of N1 CORESET(s) in the N CORESETs satisfies the first condition, the N1 CORESET(s) belongs(respectively belong) to N1 serving cell(s) in the reference cell set, N1 being a positive integer less than N; the second cell set comprises all serving cells other than the N1 serving cell(s) in the reference cell set; the first cell set comprises the reference cell set.

In one embodiment, any CORESET other than the N1 CORESET(s) in the N CORESETs does not satisfy a first condition.

In one embodiment, the first cell set is the reference cell set.

Embodiment 11

Figure 11:
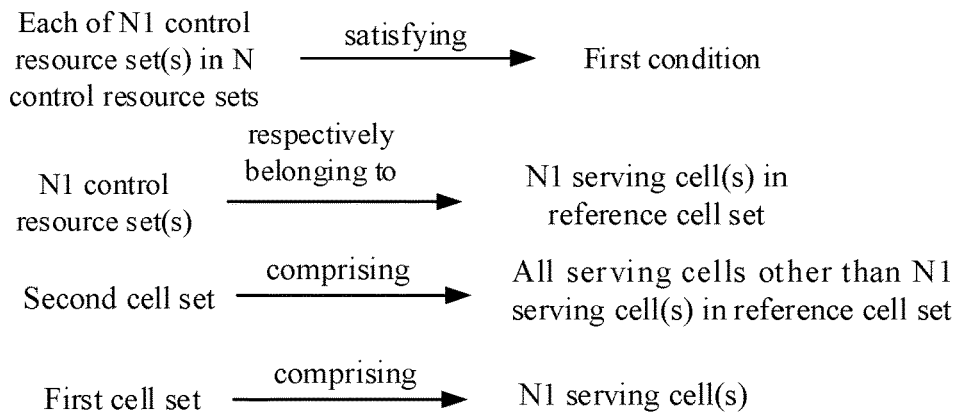
FIG. 11 illustrates a schematic diagram of whether N CORESETs respectively satisfy a first condition being used to determine a first cell set and a second cell set out of a reference signal set according to one embodiment of the present application.

Embodiment 11 illustrates a schematic diagram of whether N CORESETs respectively satisfy a first condition being used to determine a first cell set and a second cell set out of a reference signal set according to one embodiment of the present application, as shown in FIG. 11.

In embodiment 11, each of N1 CORESET(s) in the N CORESETs satisfies the first condition, the N1 CORESET(s) belongs(respectively belong) to N1 serving cell(s) in the reference cell set, N1 being a positive integer less than N; the second cell set comprises all serving cells other than the N1 serving cell(s) in the reference cell set; the first cell set comprises the N1 serving cell(s).

Embodiment 12

Figure 12:
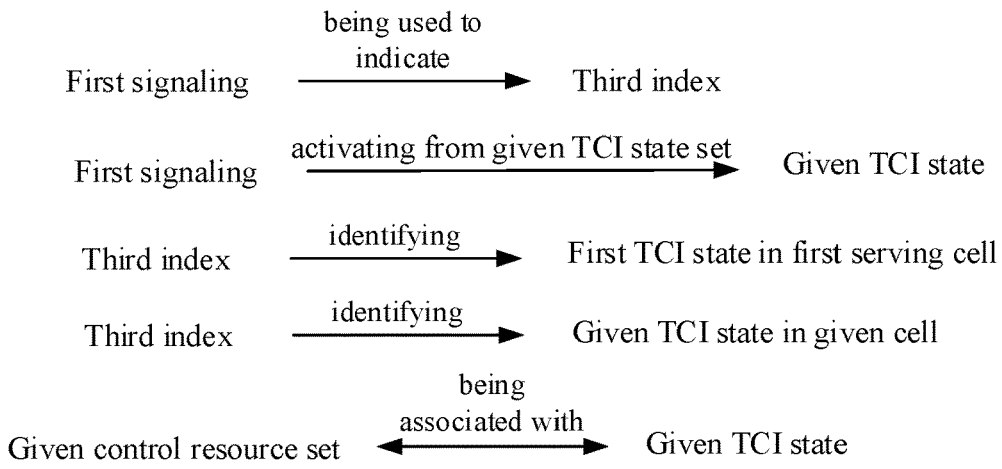
FIG. 12 illustrates a schematic diagram of a first signaling being applied to each serving cell in a target cell set according to one embodiment of the present application.

Embodiment 12 illustrates a schematic diagram of a first signaling being applied to each serving cell in a target cell set according to one embodiment of the present application, as shown in FIG. 12.

In embodiment 12, the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

In one embodiment, only the given TCI state in the given TCI state set is activated by the first signaling.

In one embodiment, at least the given TCI state in the given TCI state set is activated by the first signaling.

In one embodiment, the first signaling is used to activate a given TCI state subset out of the given TCI state set, and the given TCI state subset at least comprises a given TCI state; each TCI state in the first TCI state subset is identified by an index in a first index group, and any TCI state in the given TCI state subset is identified by an index in the first index group.

In one embodiment, a number of TCI state(s) comprised in the first TCI state subset is the same as a number of index(es) comprised in the first index group.

In one embodiment, a number of TCI state(s) comprised in the first TCI state subset is the same as a number of TCI state(s) comprised in the given TCI state subset.

In one embodiment, in response to receiving the first signaling, the given CORESET is associated with the given TCI state.

Embodiment 13

Figure 13:
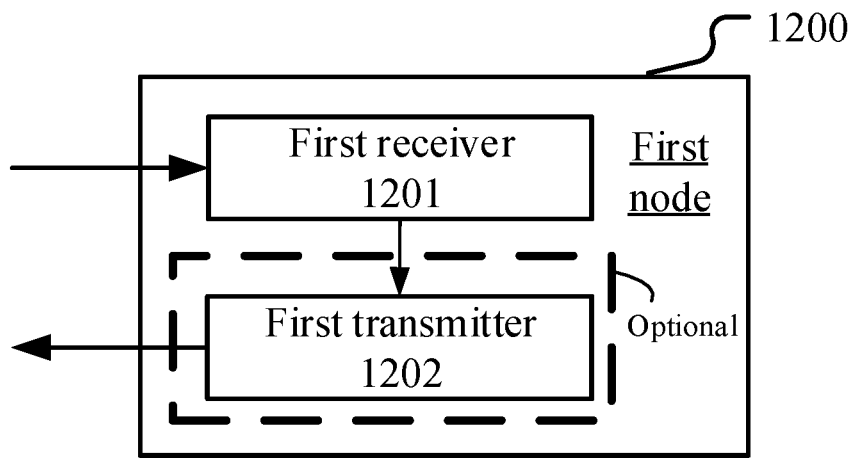
FIG. 13 illustrates a structure block diagram of a processor in a first node according to one embodiment of the present application.

Embodiment 13 illustrates a structure block diagram of a processor in a first node according to one embodiment of the present application, as shown in FIG. 13. In FIG. 13, a processor 1200 in a first node comprises a first receiver 1201 and a first transmitter 1202, where the first transmitter 1202 is optional.

In one embodiment, the first node is a UE.

In one embodiment, the first node is a relay node.

In one embodiment, the first receiver 1201 comprises at least one of the antenna 452, the receiver 454, the receiving processor 456, the multi-antenna receiving processor 458, the controller/processor 459, the memory 460, or the data source 467 in Embodiment 4.

In one embodiment, the first transmitter 1202 comprises at least one of the antenna 452, the transmitter 454, the transmitting processor 468, the multi-antenna transmitting processor 457, the controller/processor 459, the memory 460, or the data source 467 in Embodiment 4.

the first receiver 1201 receives a first signaling;

In embodiment 13, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

In one embodiment, the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set.

In one embodiment, each of N1 CORESET(s) in the N CORESETs satisfies the first condition, the N1 CORESET (s) belongs(respectively belong) to N1 serving cell(s) in the reference cell set, N1 being a positive integer less than N; the second cell set comprises all serving cells other than the N1 serving cell(s) in the reference cell set; the first cell set comprises the reference cell set, or, the first cell set comprises the N1 serving cell(s).

In one embodiment, the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

In one embodiment, the first node comprises:
the first transmitter 1202 transmitting a first signal in a first time unit; and
the first receiver 1201 monitoring a first-type channel in the first CORESET;
herein, the first signal is used to indicate that the first signaling is correctly received, and the first time unit is used to determine the second time unit; starting from the second time unit, the first TCI state is used to determine antenna port Quasi Co-Location (QCL) of the first-type channel in the first CORESET.

In one embodiment, the first node comprises:
the first transmitter 1202 transmitting a first signal in a first time unit; and
the first receiver 1201 receiving a second signaling in the first CORESET; and the first receiver 1201 receiving a second signal;
herein, the first signal is used to indicate that the first signaling is correctly received, time-domain resources occupied by the second signaling are not earlier than a second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

Embodiment 14

Figure 14:
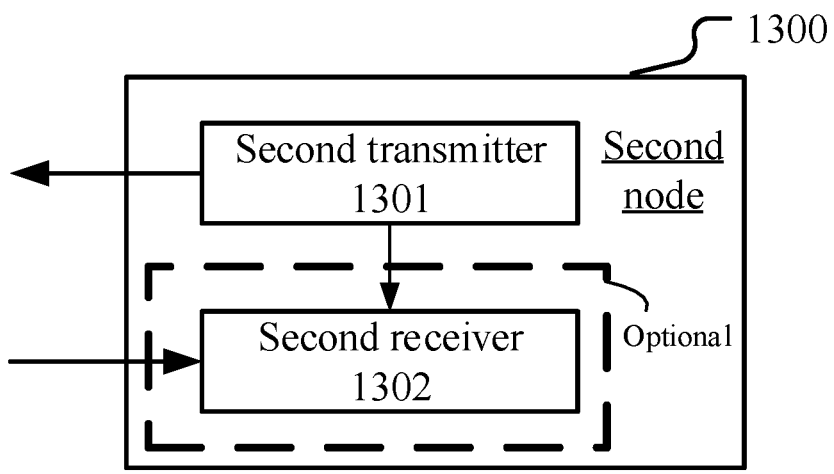
FIG. 14 illustrates a structure block diagram of a processor in a second node according to one embodiment of the present application.

Embodiment 14 illustrates a structure block diagram of a processor in a second node according to one embodiment of the present application as shown in FIG. 14. In FIG. 14, a processor 1300 of a second node comprises a second transmitter 1301 and a second receiver 1302, where the second receiver 1302 is optional.

In one embodiment, the second node is a base station.
In one embodiment, the second node is a UE.
In one embodiment, the second node is a relay node.
In one embodiment, the second transmitter 1301 comprises at least one of the antenna 420, the transmitter 418, the transmitting processor 416, the multi-antenna transmitting processor 471, the controller/processor 475, or the memory 476 in embodiment 4.
In one embodiment, the second receiver 1302 comprises at least one of the antenna 420, the receiver 418, the receiving processor 470, the multi-antenna receiving processor 472, the controller/processor 475, the memory 476 in embodiment 4.

The second transmitter 1301, transmits a first signaling;
In embodiment 14, the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

In one embodiment, a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

In one embodiment, the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set.

In one embodiment, each of N1 CORESET(s) in the N CORESETs satisfies the first condition, the N1 CORESET (s) belongs(respectively belong) to N1 serving cell(s) in the reference cell set, N1 being a positive integer less than N; the second cell set comprises all serving cells other than the N1 serving cell(s) in the reference cell set; the first cell set comprises the reference cell set, or, the first cell set comprises the N1 serving cell(s).

In one embodiment, the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

In one embodiment, the second node comprises:
the second receiver 1302 receiving a first signal in a first time unit; and
the second transmitter 1301 transmitting a first-type channel in the first CORESET;
herein, the first signal is used to indicate that the first signaling is correctly received, and the first time unit is used to determine the second time unit; starting from the second time unit, the first TCI state is used to determine antenna port Quasi Co-Location (QCL) of the first-type channel in the first CORESET.

In one embodiment, the second node comprises:
the second receiver 1302 receiving a first signal in a first time unit; and
the second transmitter 1301 transmitting a second signaling in the first CORESET; the second transmitter 1301 transmitting a second signal;
herein, the first signal is used to indicate that the first signaling is correctly received, time-domain resources occupied by the second signaling are not earlier than a second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, etc. The base station or system device in the present application includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A first node for wireless communications, comprising:
a first receiver, receiving a first signaling;
wherein the first signaling comprises a first index and a second index, a first serving cell is identified by the first index, and a first Control Resource Set (CORESET) in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORE SET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

2. The first node according to claim 1, wherein a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

3. The first node according to claim 1, wherein the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set;
or, the first cell set consists of at least one serving cell in the reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set; each of NI CORESET(s) in the N CORESETs satisfies the first condition, the N1 CORESET(s) respectively belong to NI serving cell(s) in the reference cell set, N1 being a positive integer less than N; the second cell set comprises all serving cells other than the N1 serving cell(s) in the reference cell set; the first cell set comprises the reference cell set, or, the first cell set comprises the N1 serving 1 cell(s).

4. The first node according to claim 1, the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

5. The first node according to claim 1,
comprising: a first transmitter, transmitting a first signal in a first time unit; the first receiver monitoring a first-type channel in the first CORESET; wherein the first signal is used to indicate that the first signaling is correctly received, and the first time unit is used to determine a second time unit; starting from the second time unit, the first TCI state is used to determine antenna port Quasi Co-Location (QCL) of the first-type channel in the first CORESET;
or, comprising: the first transmitter, transmitting the first signal in the first time unit; the first receiver receiving a second signaling in the first CORESET; the first receiver receiving a second signal; wherein the first signal is used to indicate that the first signaling is correctly received, time-domain resources occupied by the second signaling are not earlier than the second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

6. A second node for wireless communications, comprising:
a second transmitter, transmitting a first signaling;
wherein the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the 2 second index is a non-negative integer.

7. The second node according to claim 6, wherein a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

8. The second node according to claim 6, wherein the first cell set consists of at least one serving cell in a reference cell set, the second cell set consists of at least one serving cell in the reference cell set, and the reference cell set comprises N serving cells, N being a positive integer greater than 1: N CORESETs are respectively CORESETs identified by the second index among the N serving cells: whether the N CORESETs respectively satisfy the first condition is used to determine at least one of the first cell set or the second cell set out of the reference cell set:
or, the first cell set consists of at least one serving cell in the reference cell set, the second cell set consists of at least one serving cell in the reference cell set, and the reference cell set comprises N serving cells, N being a positive integer greater than 1: N CORESETs are respectively CORESETs identified by the second index among the N serving cells: whether the N CORESETs respectively satisfy the first condition is used to determine at least one of the first cell set or the second cell set out of the reference cell set: each of N1 CORESET(s) in the N CORESETs satisfies the first condition, the N1 CORESET(s) respectively belong to N1 serving cell(s) in the reference cell set, N1 being a positive integer less than N: the second cell set comprises all serving cells other than the N1 serving cell(s) in the reference cell set: the first cell set comprises the reference cell set, or, the first cell set comprises the N1 serving cell(s).

9. The second node according to claim 6, the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index: the first signaling is used to activate a given TCI state out of the given TCI state set, and the given TCI state in the given cell is identified by the third index, the third index being a non-negative integer; the given CORESET is associated with the given TCI state.

10. The second node according to claim 6,
comprising: a second receiver, receiving a first signal in a first time unit; the second transmitter transmitting a first-type channel in the first CORESET; wherein the first signal is used to indicate that the first signaling is correctly received, and the first time unit is used to determine a second time unit: starting from the second time unit, the first TCI state is used to determine antenna port Quasi Co-Location (QCL) of the first-type channel in the first CORESET;

or, comprising: the second receiver, receiving the first signal in the first time unit; the second transmitter transmitting a second signaling in the first CORESET; transmitting a second signal; wherein the first signal is used to indicate that the first signaling is correctly received, time-domain resources occupied by the second signaling are not earlier than the second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

11. A method in a first node for wireless communications, comprising:
receiving a first signaling;
wherein the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

12. The method according to claim 11, wherein a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

13. The method according to claim 11, wherein the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set;
or, the first cell set consists of at least one serving cell in the reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set; each of N1 CORESET(s) in the N CORESETs satisfies the first condition, the N1 CORESET(s) respectively belong to N1 serving cell(s) in the reference cell set, N1 being a positive integer less than N; the second cell set comprises all serving cells other than the N1 serving cell(s) in the reference cell set; the first cell set comprises the reference cell set, or, the first cell set comprises the N1 serving cell(s).

14. The method according to claim 11, the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

15. The method according to claim 11, comprising:
transmitting a first signal in a first time unit; and monitoring a first-type channel in the first CORESET; wherein the first signal is used to indicate that the first signaling is correctly received, and the first time unit is used to determine a second time unit; starting from the second time unit, the first TCI state is used to determine antenna port Quasi Co-Location (QCL) of the first-type channel in the first CORESET;
or, transmitting the first signal in the first time unit; receiving a second signaling in the first CORE SET; and receiving a second signal; wherein the first signal is used to indicate that the first signaling is correctly received, time-domain resources occupied by the second signaling are not earlier than the second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

16. A method in a second node for wireless communications, comprising:
transmitting a first signaling; wherein the first signaling comprises a first index and a second index, a first serving cell is identified by the first index, and a first CORESET in the first serving cell is identified by the second index; a first TCI state set is configured to the first serving cell, and the first signaling is used to activate a first TCI state out of the first TCI state set; the first CORESET is associated with the first TCI state; the first signaling is applied to each serving cell in a target cell set, and the target cell set at least comprises the first serving cell; when the first CORESET satisfies a first condition, the target cell is a first cell set; when the first CORESET does not satisfy the first condition, the target cell set is a second cell set; the first condition comprises: being related to a non-unicast channel; the first cell set comprises at least one serving cell, the second cell set comprises at least one serving cell, the first index is a non-negative integer, and the second index is a non-negative integer.

17. The method according to claim 16, wherein a first given cell is a serving cell in the first cell set, a first given CORESET in the first given cell is identified by the second index, and the first given CORESET satisfies the first condition; a second given cell is any serving cell in the second cell set, a second given CORESET in the second given cell is identified by the second index, and the second given CORESET does not satisfy the first condition.

18. The method according to claim 16, wherein the first cell set consists of at least one serving cell in a reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set;

or, the first cell set consists of at least one serving cell in the reference cell set, the second cell set consists of at least one serving cell in the reference cell set, and the reference cell set comprises N serving cells, N being a positive integer greater than 1; N CORESETs are respectively CORESETs identified by the second index among the N serving cells; whether the N CORESETs respectively satisfy the first condition is used to determine at least one of the first cell set or the second cell set out of the reference cell set; each of N1 CORESET(s) in the N CORESETs satisfies the first condition, the N1 CORESET(s) respectively belong to N1 serving cell(s) in the reference cell set, N1 being a positive integer less than N; the second cell set comprises all serving cells other than the N1 serving cell(s) in the reference cell set; the first cell set comprises the reference cell set, or, the first cell set comprises the N1 serving cell(s).

19. The method according to claim 16, the meaning of the phrase that "the first signaling is applied to each serving cell in a target cell set" comprises: a given cell is any serving cell in the target cell set, a given CORESET is a CORESET identified by the second index in the given cell, and a given TCI state set is configured to the given cell; the first signaling is used to indicate a third index, and the first TCI state in the first serving cell is identified by the third index; the first signaling is used to activate a given TCI state out of the given TCI state set, and the given TCI state in the given cell is identified by the third index, the third index being a non-negative integer; the given CORESET is associated with the given TCI state.

20. The method according to claim 16, comprising:

receiving a first signal in a first time unit; and transmitting a first-type channel in the first CORESET; wherein the first signal is used to indicate that the first signaling is correctly received, and the first time unit is used to determine a second time unit; starting from the second time unit, the first TCI state is used to determine antenna port Quasi Co-Location (QCL) of the first-type channel in the first CORESET;

or, receiving the first signal in the first time unit; and transmitting a second signaling in the first CORESET; and transmitting a second signal; wherein the first signal is used to indicate that the first signaling is correctly received, time-domain resources occupied by the second signaling are not earlier than the second time unit, and the first time unit is used to determine the second time unit; the first signaling is used to activate a first TCI state subset out of the first TCI state set, and the first TCI state subset at least comprises the first TCI state; the second signaling is used to indicate a second TCI state out of the first TCI state subset, and the second TCI state is used to determine antenna port Quasi Co-Location (QCL) of the second signal.

* * * * *